No. 805,188. PATENTED NOV. 21, 1905.
H. E. DEY.
APPARATUS FOR CONTROLLING ELECTRIC MOTORS.
APPLICATION FILED MAY 5, 1899.

3 SHEETS—SHEET 1.

Witnesses:
Raphaël Netter
L. S. Shaw

Inventor:
Harry E. Dey
by E. M. Bentley Att'y

No. 805,133. PATENTED NOV. 21, 1905.
H. E. DEY.
APPARATUS FOR CONTROLLING ELECTRIC MOTORS.
APPLICATION FILED MAY 5, 1899.

3 SHEETS—SHEET 2.

Witnesses:
Raphaël Netter
L. L. Shaw

Inventor:
Harry E. Dey
by E. M. Brittery Att'y.

No. 805,188. PATENTED NOV. 21, 1905.
H. E. DEY.
APPARATUS FOR CONTROLLING ELECTRIC MOTORS.
APPLICATION FILED MAY 5, 1899.
3 SHEETS—SHEET 3.
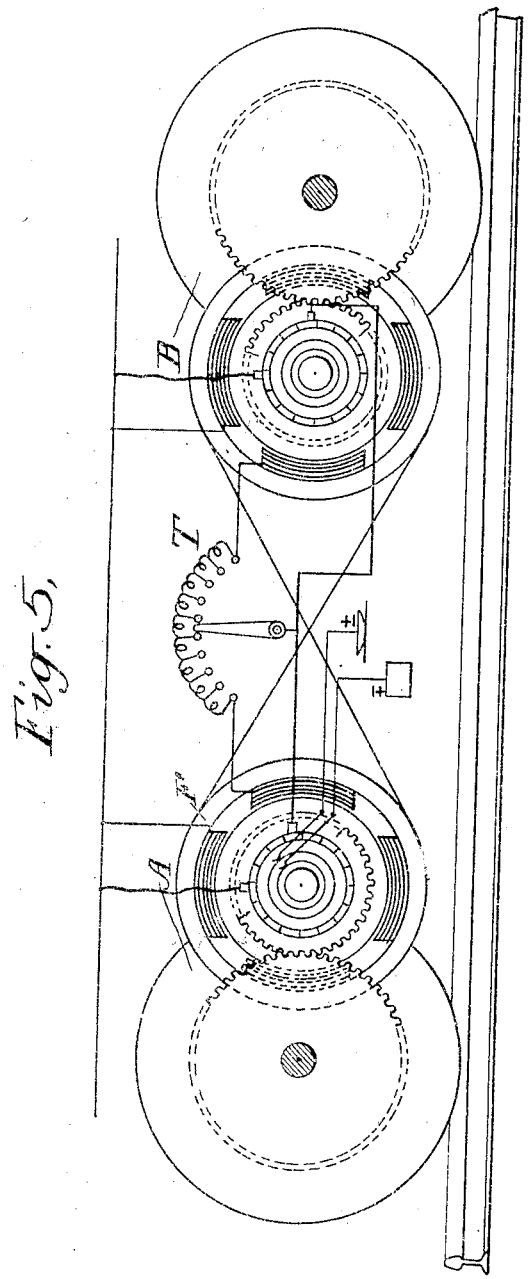

UNITED STATES PATENT OFFICE

HARRY E. DEY, OF BROOKLYN, NEW YORK, ASSIGNOR TO ERNEST R. ESMOND, OF NEW YORK, N. Y.

APPARATUS FOR CONTROLLING ELECTRIC MOTORS.

No. 805,188.     Specification of Letters Patent.     Patented Nov. 21, 1905.

Application filed May 5, 1899. Serial No. 715,756.

*To all whom it may concern:*

Be it known that I, HARRY E. DEY, a citizen of the United States, residing at New York city, borough of Brooklyn, county of Kings, State of New York, have invented certain new and useful Improvements in Apparatus for Controlling Electric Motors, of which the following is a specification, reference being made to the accompanying drawings, wherein—

Figure 1:
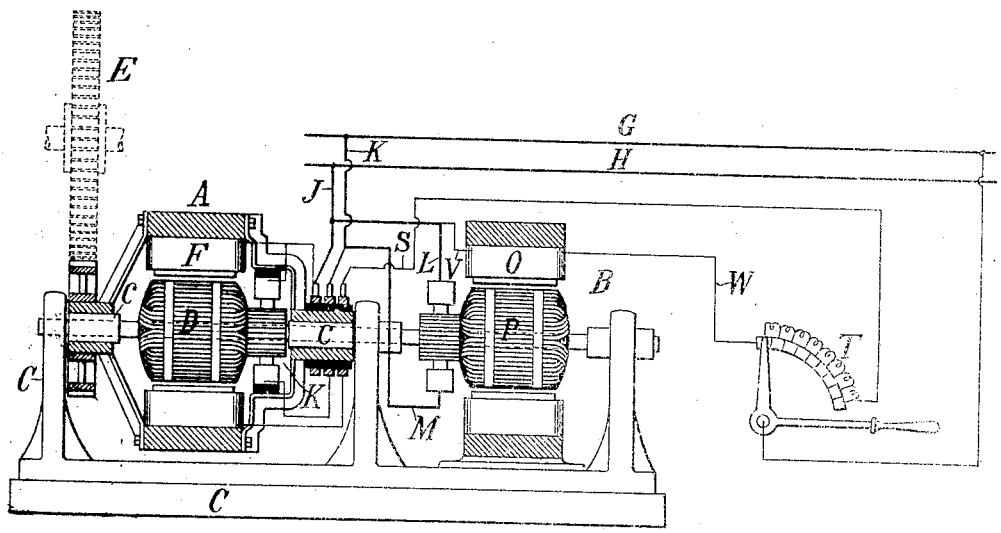
Figure 2:
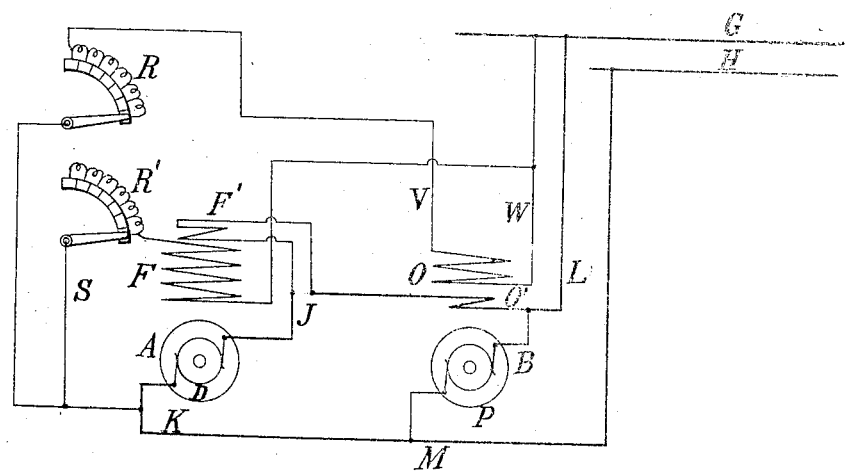
Figure 3:
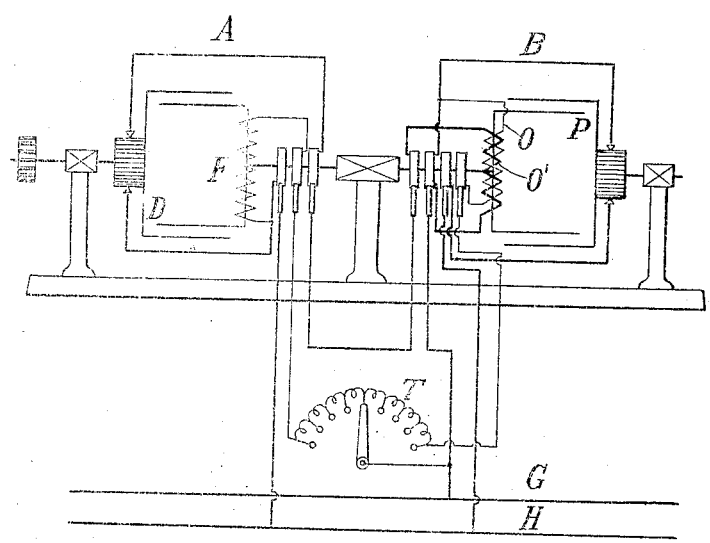
Figure 4:
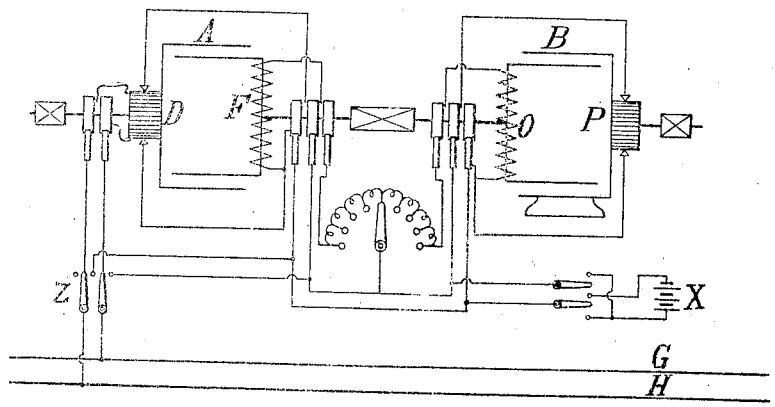

Figure 1 represents a motor controlled according to the fundamental principle of my invention. Figs. 2 and 3 are diagrams representing different forms of the invention, and Figs. 4 and 5 represent the invention applied to an alternating-current motor.

My invention relates to a method of controlling the power and speed of an electric motor in which the armature and field-magnet have each a movement with relation to the stationary position of the other, which is ordinarily secured by permitting both the armature and the field-magnet to rotate. Heretofore it has been proposed to regulate motors of this type by connecting one element, either the field-magnet or armature, to the load and adjusting the speed of the other element by means of a friction-brake. This method, however, obviously entails a decided loss by friction so long as the brake-control element continues to rotate, while it also involves mechanical difficulties in adjusting and regulating the pressure of the brake and in bringing the element to which the brake is applied to a standstill. Instead of employing a friction-brake I attain similar results by a device which may be called an "electrogenerative brake," since I apply the "free-motor" element (which term may be used to designate the element which is not connected to the load) to drive an electric generator of any convenient type whose output may be regulated so as to impose a greater or less load on the free-motor element.

The electromotive force of the braking-generator may be utilized in any desired manner. For example, it may work back upon the main line or it may supplement the controlled motor. In this manner a high degree of economy is insured.

The invention may also be applied to an alternating-current motor, the braking effect being produced by causing it to generate a direct current which may be utilized in the alternating-current motor by means of a commutator connected to the armature-winding, as in a rotary transformer.

Referring to the drawings, Fig. 1, A designates the machine to be controlled, and B the braking-machine. The machine A has its field-magnet F journaled on the exterior of studs or bosses c c, projecting from the standards on frame C and is geared to the load E. The armature D is journaled on bearings within the studs c c. The current, as usual, is delivered to the field-magnet by means of collector-rings and to the armature by means of commutator-brushes on the field-magnet, the details not being illustrated, since they are familiar to the art, although fully indicated in the diagram. Machine B has a stationary field-magnet, while its armature is on the same shaft with that of machine A. It will be understood that various equivalent arrangements may be made giving the fundamental effect of two connected armatures and two field-magnets—one operating the load and the other stationary—while it will also be understood that the arrangement may be reversed, the armature of machine A being geared to the load and its field-magnet driving the rotary-element machine B, either the field-magnet or armature, or that the two free elements may be concentric one inside the other and the two embraced by the loaded and stationary elements.

The supply-wires G and H are connected by wires J and K to the armature D and by shunt-wires R and S—the latter including rheostat T—to the field-magnet F. In like manner wires L and M supply armature P, and shunt-wires V and W the field-magnet O, which is also regulated by the rheostat T.

In operation armature D will be constantly running and field-magnet F be made to rotate in the opposite direction at a variable speed. Thus armature D might, for example, have a speed of eighteen hundred turns per minute running free, but without sufficient torque to start the field-magnet F. If, then, a brake is applied to armature D, its speed will decrease and its torque increase by reason of the greater current until the field-magnet F starts. Finally D and F will rotate together in opposite directions, each at a speed of nine hundred turns. The capacity of the machine is increased to an extent represented by the speed of field-magnet F, and this additional capacity will be taken up in driving-machine B as a generator regulated through the desired range by any desired means—such, for example, as the adjustment of its field-magnet strength by rheostat T. The output of machine B passes by wires L and M back to machine A by the wires J and K to assist in supplying a current to the latter machine. The total energy of A may thus be adjusted economically and divided into two components—one driving the load E, the other driving machine B. When load E is at rest, both machines will run free as motors, the resistance T being all included in the circuit of field-magnet O, there being none of it in the circuit of field-magnet F. In this condition the two machines will take just enough armature-current to keep up the rotation. If resistance T is then partially cut out, field-magnet O will increase in strength and field-magnet F decrease. Machine B will then begin to act as a generator and machine A will slow down, so as to take more current and start the load E, and it will continue to drive both the load and the generator P with a speed entirely under a control of rheostat T.

Rheostat T may be applied, if desired, to the field-magnet of machine B only, that of machine A being left unchanged, or each machine may have its individual rheostat, as appears in Fig. 2.

The arrangement indicated in Fig. 2 is substantially the same as that of Fig. 1, except that a series field-magnet coil O' is applied to machine B, supplementing the coil O, and, if desired, a similar series coil F'' may be applied to the field-magnet of machine A, but so wound as to oppose coil F. Coils O' and F'' will be in series with armature D, and by this means an overload on machine A will weaken its field-magnet and cause it to speed up and increase equally the field of machine B, whose armature P will thus give a higher electromotive force. Consequently the machine B cannot be converted into a motor by an abnormal drop in its electromotive force. In Fig. 2, moreover, both machines A and B have their individual rheostats R' and R, respectively.

In Fig. 3 there is the same arrangement as in Fig. 2 except that the two field-magnets are geared together and constitute the free-running elements, while the armature of machine A is geared to the load and that of machine B is stationary.

In Fig. 4 machine A has its armature D provided with the usual commutator and also with collecting-rings connected, respectively, to certain of the commutator-bars, so that it may be operated either by direct or alternating currents. In the latter case it will be a synchronous alternating-current motor, and while its armature and field-magnet are in synchronism the absolute speed of the machine will be varied by the means already described. Thus if the synchronous speed is eighteen hundred the field or the armature may run at this speed while the opposite element is stationary, or each may run at nine hundred, and between these extremes the loaded element may have any desired speed. The free-running element will be the field-magnet F, that will drive machine B in the manner already explained, and the direct current of machine B may also be applied to the armature-winding of machine A through the commutator to assist in driving it. Any desired means may be employed for starting the free-running element. For example, a battery X may be provided and by means of a suitable switch will start the machine B as a motor.

The arrangement in Fig. 4 may be used either with direct or with alternating currents. If direct currents are used, the switch Z will be turned to apply them directly to the commutators of the two machines by the connections shown. If alternating currents are used, the switch Z will remain as shown, and it is also evident that either multiphase or single-phase alternating currents may be applied in the manner described.

In Fig. 5 the arrangement of Fig. 4 is shown as applied to the two motors of a railway-vehicle. The armatures are shown as connected to the two axles, respectively, while the free-running field-magnets are belted together. According to the previous explanation, assuming that the free-running elements are started by external means, so as to be in continuous rotation, alternating currents may be supplied to collector-rings of armature D, and its field-magnet will then in turn drive the field-magnet of machine B and generate direct currents which will be delivered to the commutator of machine A. Both machines will rotate with a speed and torque which are a resultant or compromise between the speed which machine A would have in the arrangement of Fig. 4 and the speed which machine B would have by reason of its torque as a generator when permitted to rotate, as in Fig. 5, instead of being stationary, as in Fig. 4.

It will be observed that the two field-magnets O F, being free upon the axle, could not exert any torque upon their respective armatures (which are fast on the axles) unless they were provided with some stop or abutment against which they could bear when pulling thereon. To provide for this, the two field-magnets are connected together, as indicated, by a crossed belt, so that they may react against each other when exerting torque upon their armatures, each field-magnet tending to turn the other one in the opposite direction. By this means the field-magnets while free to run without restriction when not exerting torque on the armature are still enabled to react against each other in the manner described when called upon to propel the vehicle.

One important consideration to be noted is that in the method I have described the machine A may be reversed, as well as regulated, by changing the power of the braking-generator without a reversing-switch. Thus if, as explained, we bring the loaded element of machine A to a standstill by weakening the field-magnet strength of machine B, both armatures will speed up, and a further decrease in the field-magnet strength in machine B will still further increase the armature speed and convert machine A into a generator, dragging the loaded element around in the opposite direction. For example, if the armature speed of A is eighteen hundred running free in a given direction it will, in the manner described, bring the field magnet up to a speed of nine hundred in the opposite direction when acting as a motor, while its own speed drops to nine hundred also. On the other hand, if its speed increases from eighteen hundred to thirty-six hundred it will, as a generator, give the field-magnet a speed of nine hundred in the same direction with itself. This is under the assumption that the field-magnet of machine B alone is regulated; but if the field-magnet strength of machine A is also regulated reversely to that of B the same speed variations may be secured by a much lower maximum speed of the armatures. This is particularly desirable where it is not required to reverse machine A to full speed in the opposite direction, but simply give it a reversing tendency that will serve as a brake. In this manner the machine A may not only be deprived of its rotating tendency, but given a tendency in the opposite direction, which will afford a frictionless braking action.

It will thus be evident that machine A when acting as a motor applies its torque partly to the load and partly to the regulating-generator, and, moreover, that in driving its load the torque required therefor reacts upon the generator as a counter torque, which in turn reacts upon its field-magnet as a stationary abutment, whereas in an ordinary motor the torque reacts upon its own stationary field-magnet.

What I claim as new, and desire to secure by Letters Patent, is—

1. The combination with a dynamo-electric machine of the shunt type having both its members rotatable, of driven mechanism connected to one member of said machine, a second dynamo-electric machine, connected to the other member, said second machine being also of the shunt type and connected to the same constant-potential circuit with the first machine but in multiple therewith and a regulating resistance in the field-magnet circuit of said second machine.

2. The combination with an electric motor having both of its members rotatable, of driven mechanism connected to one member and a generator connected to the other member and provided with a field-magnet coil in the armature-circuit of the motor.

3. The combination with an electric motor having both of its members rotatable, of driven mechanism connected to one member and a compound generator connected to the other member with one field-magnet coil in shunt and another magnet-coil in series with the motor-armature, the said coils supplementing each other.

4. The combination with an electric motor having both its members rotatable and provided with two field-magnet coils opposing each other, one in shunt and the other in series with its armature, of driven mechanism connected to one motor element and a generator connected to the other.

5. The combination with a motor having both of its members rotatable, of driven mechanism connected to one member, a generator connected to the other member, both machines being of the shunt type and adjustable resistance in the field-magnet circuit of both machines controllable to simultaneously increase the current in one field-magnet and decrease that in the other.

6. The combination with a car-axle of a motor having both of its members rotatable and adapted to receive both direct and alternating current, of line connections supplying the said motor with alternating currents and a generator driven by a car-axle and supplying the said motor with direct current.

7. The combination with a dynamo-electric machine of the shunt type having both its members rotatable, of driven mechanism connected to one member, a second dynamo-electric machine connected to the other member, the said second machine being also of the shunt type and connected to the same constant-potential circuit as the first machine, and an adjustable resistance in the field-magnet circuit of each machine respectively.

8. The combination of mechanism to be driven of two dynamo-electric machines of the shunt type connected in multiple to the same constant-potential supply-circuit, one machine having both its members rotatable, one member being connected to the load and the other being connected to a member of the other machine and a regulating resistance in the field-magnet circuit of one or both machines.

9. The combination with a driven mechanism of an electric motor on a constant-potential supply-circuit having both its members rotatable, a dynamo of the shunt type driven by the said motor and also feeding the motor, and a speed-regulator for the said mechanism comprising an adjustable rheostat in the field-magnet circuit of the generator aforesaid.

10. The combination with a driven mechanism of an electric motor on a constant-potential supply-circuit having both its members rotatable, a generator of the shunt type, driven by the said motor and also feeding the motor, and a speed-regulator for the said mechanism comprising an adjustable resistance in the field-magnet circuit of the dynamo aforesaid.

11. The combination with an electric motor of the synchronous alternating-current type, of a direct-current generator driven thereby, mechanism also driven thereby and a speed-regulator for the said mechanism comprising an adjustable resistance in the circuit of the said generator.

12. The combination with an electric motor of the synchronous alternating-current type, of a direct-current generator of the shunt type driven thereby, mechanism also driven thereby and a speed-regulator for the mechanism comprising an adjustable resistance in the shunt field-magnet circuit of the said generator.

13. The combination with an electric motor having its armature-winding connected to a direct-current commutator and also connected to alternating-current contact-rings, of a direct-current generator driven thereby and supplying current to the motor aforesaid through its direct-current commutator, mechanism driven by the said motor and a speed-regulator for the mechanism comprising an adjustable resistance in the circuit of the said generator.

14. The combination with an alternating-current motor having both of its members rotatable and operating synchronously with respect to each other but at a variable speed with respect to external objects, of a driven mechanism and an electric generator, both operated by the said motor, and a speed-regulator for the mechanism comprising means for regulating the output of the said generator.

15. The combination with a driven mechanism of an alternating-current motor supplied with current from a line and operating the said mechanism, a generator also operated by said motor and connections for returning the energy developed by said generator to the said motor.

16. The combination with two shafts mechanically connected of a line-supplied motor driving one shaft and a generator intervening between the said motor and the other shaft and supplying energy to the motor.

17. The combination with two driven shafts mechanically connected of a dynamo-electric machine having one of its members mechanically connected to one of said shafts and its other member rotatable and a second dynamo-electric machine having one of its members connected to the rotary member of the first machine and its other member to the second shaft.

In witness whereof I have hereunto set my hand, before two subscribing witnesses, this 1st day of May, 1899.

HARRY E. DEY.

Witnesses:
L. T. SHAW,
E. R. ESMOND.